(No Model.) 3 Sheets—Sheet 1.
E. CUTLAN.
TOOL FOR SPIRAL TURNING.

No. 403,521. Patented May 21, 1889.

Witnesses: Inventor:

(No Model.) 3 Sheets—Sheet 2.

E. CUTLAN.
TOOL FOR SPIRAL TURNING.

No. 403,521. Patented May 21, 1889.

Witnesses:

Inventor:
Ellis Cutlan (No Model.) 3 Sheets—Sheet 3.

E. CUTLAN.
TOOL FOR SPIRAL TURNING.

No. 403,521. Patented May 21, 1889.

Witnesses: Inventor:

UNITED STATES PATENT OFFICE.

ELLIS CUTLAN, OF LONDON, ENGLAND.

TOOL FOR SPIRAL TURNING.

SPECIFICATION forming part of Letters Patent No. 403,521, dated May 21, 1889.

Application filed July 5, 1888. Serial No. 279,021. (No model.)

*To all whom it may concern:*

Be it known that I, ELLIS CUTLAN, a subject of the Queen of Great Britain, residing at London, England, have invented a new and useful Improved Tool for Spiral Turning, of which the following is a specification.

My invention relates to tools for turning or cutting wood spirals, and it comprises the improvements hereinafter described.

Figure 1:
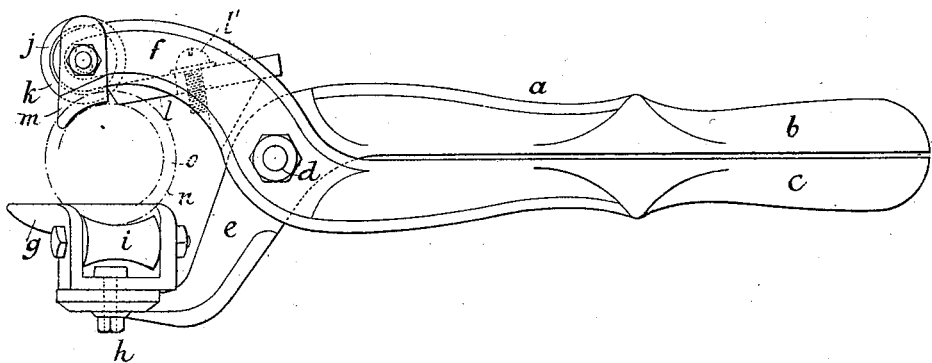
Figure 2:
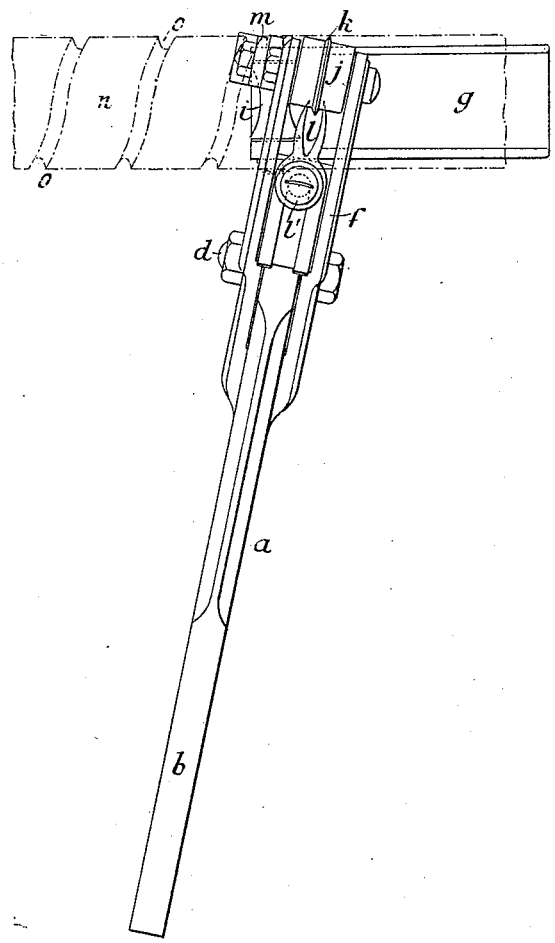
Figure 3:
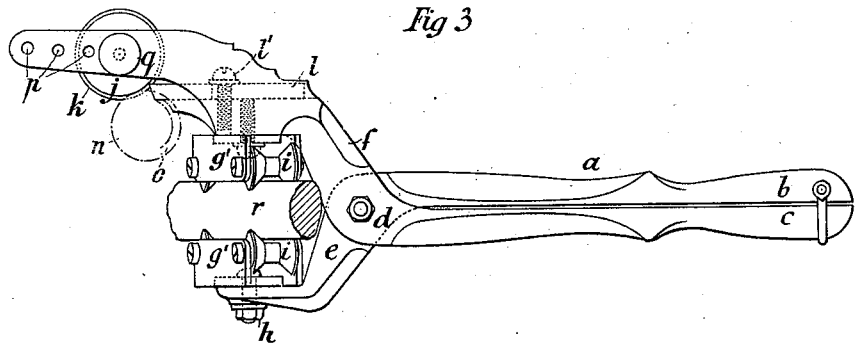
Figure 4:
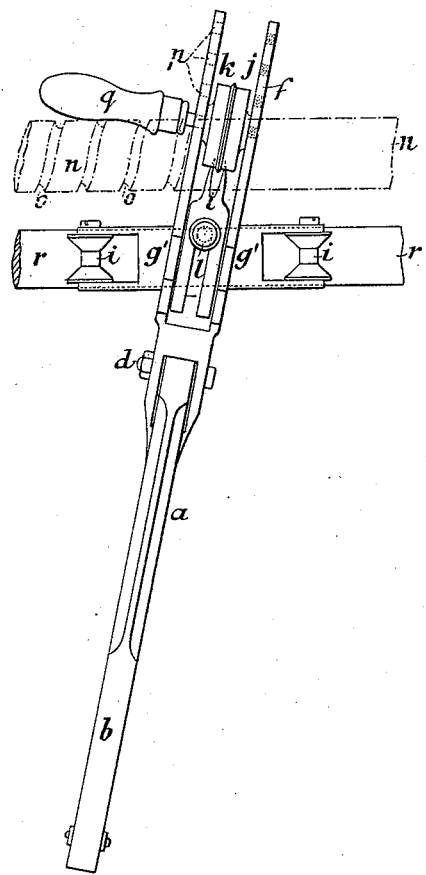
Figure 5:
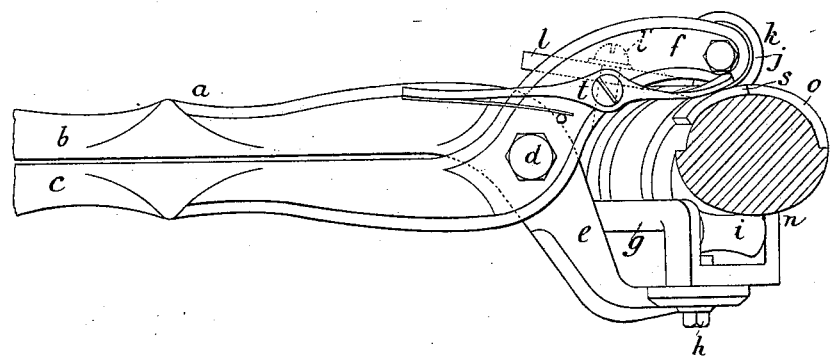
Figure 6:
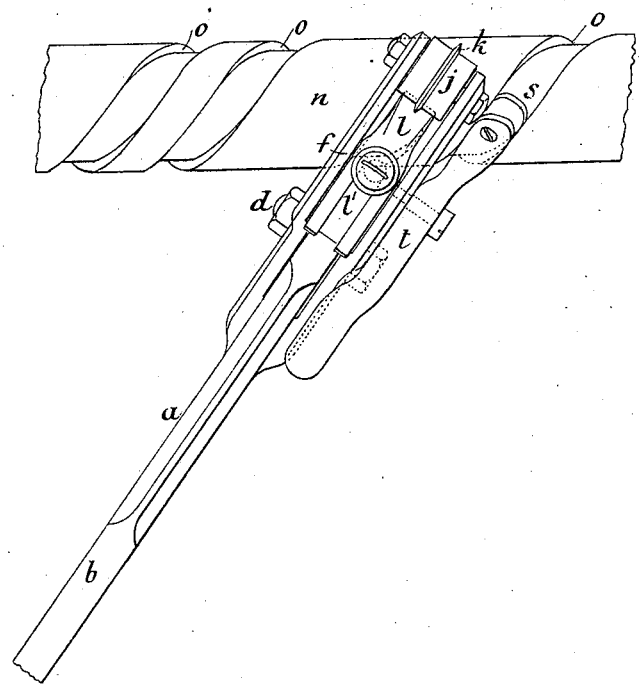

In the accompanying drawings, Figure 1 is a side elevation of a spiral-turning tool constructed according to my invention and adapted to turn a single spiral, and Fig. 2 is a top view or plan of the same. Figs. 3 and 4 are views similar to Figs. 1 and 2, respectively, illustrating a modified form of tool. Figs. 5 and 6 are side and plan views, respectively, of a tool adapted for turning a spiral having two or more threads.

Similar letters of reference indicate corresponding parts in all the figures.

$a$ is the frame of the tool, which comprises two handles, $b$ $c$, pivoted together at $d$ and having the arms or extensions $e$ $f$, respectively, the latter being bifurcated.

$g$ is a rubbing-piece or guide, which is pivotally carried upon the arm $e$, and which is adapted to be set at any angle relatively to the longitudinal axis of the tool by means of the nut $h$. This guide is hollowed out on its upper side, as shown in Fig. 1, to lie against the surface of the material in which the spiral groove is to be formed. A roller, $i$, is placed in the said guide, in order to reduce the friction between the guide and the wood as much as possible.

$j$ is a roller, which is mounted in the bifurcation of the arm $f$, so as to rotate, and provided with a blade, $k$, forming a leading-guide.

$l$ is the cutting-tool proper, hereinafter termed the "cutter," the same cutter being arranged immediately behind the blade $k$, and of a shape corresponding to the shape of the groove to be cut. This cutter is rendered adjustable by a screw, $l'$.

$m$ is an auxiliary guide. The said leading-guide $j$ $k$, in conjunction with the guide $g$, maintains the cutter steady relatively to its work, notwithstanding the size of the cut. The said roller also serves to regulate the depth of cut made by the cutter.

$n$ represents in dotted lines a piece of wood in which a groove is being cut, and $o$ a groove cut therein.

The operation of my invention is as follows: The piece of wood in which it is desired to cut a spiral groove is first smooth-turned to the desired size, as shown at $n$, and placed between the lathe-centers, and then the tool is placed thereon, as shown, so that the work is located between the guide $g$ and the roller $j$ and blade $k$, the guide $g$ having been previously set, as hereinbefore described, to the required angle. As the piece $n$ rotates, the tool is caused to travel, owing to the blade $k$ cutting into the wood at an angle to its axis, as shown. The cutter $l$ is also so set that it cuts into the material as the tool travels, so that the spiral groove $o$ is formed, which can be enlarged to any desired extent. The auxiliary guide $m$ is set to follow in the groove $o$, formed by the cutter, to assist the travel of the tool.

In the modification of my invention shown in Figs. 3 and 4 the tool is adapted for cutting spirals on pieces $n$ of varying diameters, the roller $j$ being adjustable in the arm $f$, the latter being provided with a series of holes, $p$, into which the pin $q$, carrying the said leading-guide, can be inserted. In this modification the guide $g$, which bears against the material being turned, is dispensed with, guides $g'$ $g'$, adapted to run upon a bar $r$, fixed parallel to the work, being employed. These guides are mounted on the arms $e$ $f$ and provided with anti-friction rollers $i$ $i$. The angular adjustment is effected by fixing the position of the lower guide, $g'$, by means of the nut $h$.

In the modification of my invention shown in Figs. 5 and 6 the construction is substantially the same as that shown in Figs. 1 and 2, except that the tool is especially adapted for forming two or more threads or spirals upon a single piece of material. For this purpose I provide the auxiliary guide $s$, adapted to run in the groove previously cut. This guide is attached to a spring-lever, $t$, so that it can be moved out of the groove in which it is running when the tool has reached the end of its traverse.

I wish it understood that I do not limit myself to the details of construction hereinbefore described, as it is obvious that I can vary the same without departing from the nature of my invention. For instance, instead of employing a rotating leading-guide, $k$, I can employ a blade fixed in any suitable manner to the arm $f$.

Having now particularly described and ascertained the nature of my said invention and in what manner the same is to be performed, I declare that what I claim is—

1. In a spiral-turning tool, the combination, with a pair of pivoted handles and arms, of a guide adjustable relatively to the longitudinal axis of the tool and arranged upon one of the arms to run on the work or upon a bar or rod parallel to the work, and a blade, $k$, carried upon the other arm for causing the traverse of the tool relatively to the work, for the purpose specified.

2. In combination with a pair of pivoted handles and arms and with the cutter $l$, a leading-guide $j\ k$, made adjustable in its supporting-arm $f$ by means of pin $q$, and a series of holes, $p$, adapted to receive said pin, whereby the tool may cut spirals on pieces of different diameters.

ELLIS CUTLAN.

Witnesses:
G. F. REDFERN,
JOHN E. BONSFIELD.